United States Patent [19]

Morris, Jr.

[11] 4,105,142

[45] Aug. 8, 1978

[54] DISPENSING DEVICE FOR FLUID SUBSTANCES

[76] Inventor: Harold K. Morris, Jr., Rte. 4, Meadow La., Flemington, N.J. 08822

[21] Appl. No.: 730,482

[22] Filed: Oct. 7, 1976

[51] Int. Cl.$^2$ ............................................. B67D 5/38
[52] U.S. Cl. ................................. 222/158; 222/450; 141/319
[58] Field of Search ................... 222/424.5, 425, 434, 222/436, 438, 440, 448, 450, 454, 456, 207, 361, 362, 158, 522, 525; 141/319–322

[56] References Cited

U.S. PATENT DOCUMENTS

| 2,638,613 | 5/1953 | Gunther | 222/563 |
| 3,094,250 | 6/1963 | Molyneaux et al. | 222/207 |
| 3,141,580 | 7/1964 | Rogers | 222/522 |
| 3,193,154 | 7/1965 | Bross | 222/207 |
| 3,592,357 | 7/1971 | Welch | 222/450 |

*Primary Examiner*—Robert B. Reeves
*Assistant Examiner*—H. Grant Skaggs
*Attorney, Agent, or Firm*—Albert Sperry; Frederick A. Zoda; John J. Kane

[57] ABSTRACT

A device for dispensing fluid substances which includes a dispensing container for holding a metered amount of the fluid substance therein immediately prior to dispensing and which includes a primary opening in the top edge thereof which is adapted to be capped during filling of the dispensing container and which is adapted to be opened when it is desired that the metered amount of fluid substance should be dispensed from the container, the dispensing container also includes a secondary opening in the lower section thereof which may be substantially smaller than the primary opening, the device further includes a hollow adapter secured to the secondary opening of the dispensing chamber and adapted to be secured to the neck of a bottle or other source of the fluid substance to be dispensed, the hollow adapter including a dispensing collar adapted to be secured to the secondary opening of the dispensing container and a holder collar adapted to be secured to the neck of a bottle or holder of the fluid substance and further including a collapsible and expandable sleeve being hollow and interconnecting the two caps of the adapter to provide a path of fluid flow communication between the holder of the fluid substance and the interior of the dispensing container, the dispensing device further including a valving system within the adapter which meters the amount of fluid substance flowing into the dispensing container, the valving system may include a rubber plug member adapted to be placed within the secondary opening of the dispensing container to prevent fluid flow communication through this opening, the positioning of the plug within the secondary opening being responsive to the expanding or collapsing of the sleeve of the adapter.

6 Claims, 5 Drawing Figures

U.S. Patent  Aug. 8, 1978  4,105,142
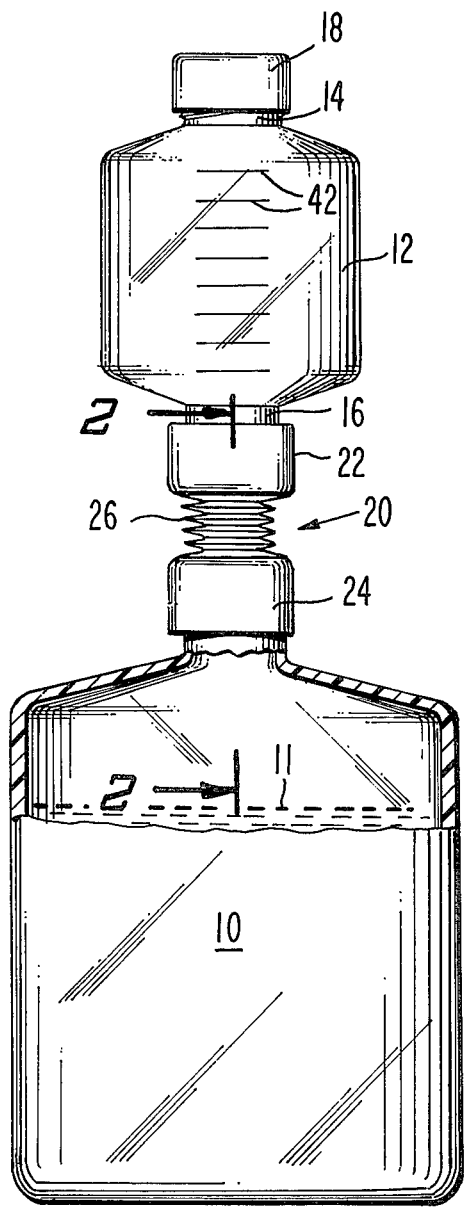
Fig. 1.
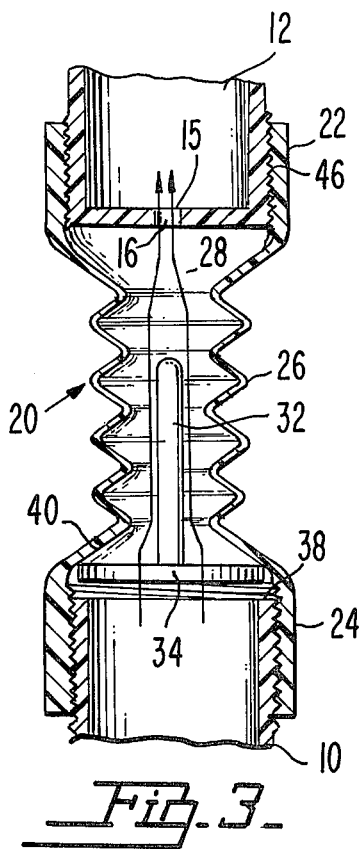
Fig. 3.
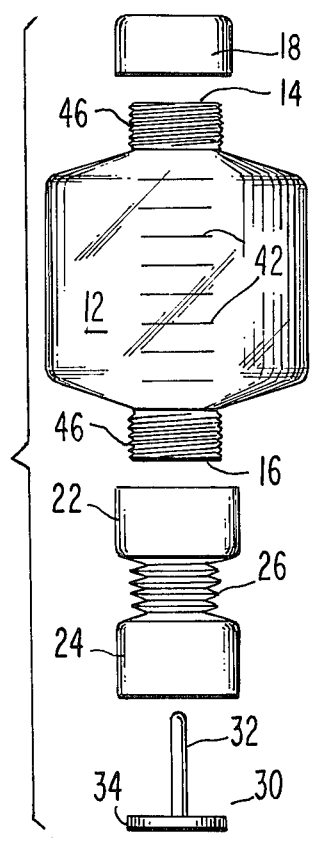
Fig. 4.
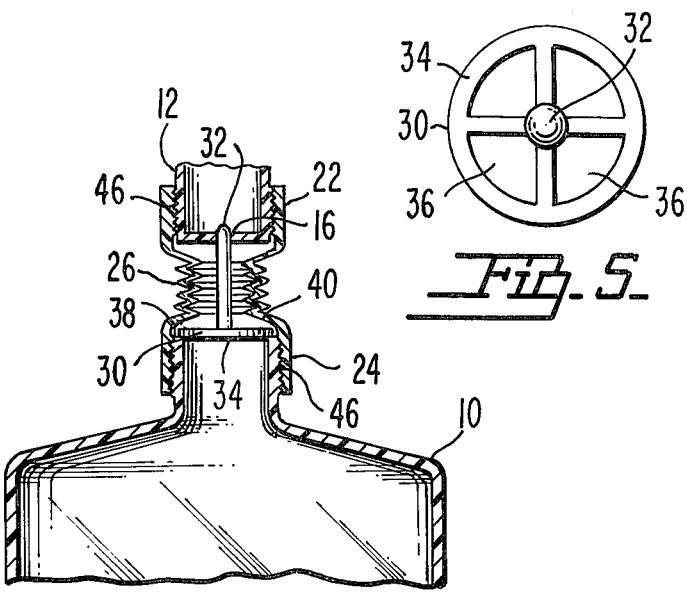
Fig. 5.
Fig. 2.

DISPENSING DEVICE FOR FLUID SUBSTANCES

BACKGROUND OF THE INVENTION

1. Field Of The Invention

The present invention is useful in the dispensing of metered amounts of fluid-type substances, particularly including liquids and particulated solids. Usually when an exact amount of substance must be utilized the use of a second graduated container is required. The holder of the source of the fluid substance will be opened and the substance will be poured into the graduated container to the desired level. Subsequent thereto the substance may be dispensed as required. This process is time consuming and requires two separate containers as well as the use of both hands by the operator.

The present invention allows the operator to use only a single hand as well as using a single integrated structure to provide an exact metered amount. Subsequent to collecting the metered amount within the dispensing container the user can reseal the holder with respect to the container, remove the capping means at the top of the dispensing container and consequently dispense the carefully metered supply of fluid substance as desired.

2. Description Of The Prior Art

Much work has been done in this field, however no patent or other prior art has been located which shows the combination of purposes and advantages of the present design. These references include U.S. Pat. Nos. 701,980, 1,153,810, 1,770,576, 2,356,755, 2,464,222, and 3,177,908. Of particular note is the patent to Fazekas for a dispenser for liquids. In this design the graduated container is undetachably affixed to the top of the source of fluid substance and a fluid flow path shown as 3 is included to provide the metered amount within the dispensing container. However this design does not include the capping means which allows dispensing of the metered substance without disconnecting the dispensing container from the source or holder of the fluid substance. In the Fazekas patent in order to dispense the metered amount of substance the member 8 must be detached from the cap 2 of the bottle 1. This is an unneeded additional step or operation which is not required in the design of the present invention due to the inclusion of a capping means for selectively dispensing the metered substance within the dispensing container after the dispensing container has been sealed from the main holder of the substance. The Fazekas patent is exemplary of each of the patents cited above which show various devices and containers for accurately metering liquids and granulated solids, however none of the devices include the detachable capping means which allows direct dispensing of the metered substance from the dispensing container without removing the dispensing container from the position of engagement with the bottle or holder of the supply of substance.

SUMMARY OF THE INVENTION

The dispensing device of the present invention includes a dispensing container secured to a hollow adapter. The dispensing container includes a primary opening and a detachable capping means over the primary opening to dispense a metered amount of substance. The dispensing container also includes a secondary opening for providing a path through which the substance may flow into the interior of the dispensing container. The adapter is detachably securable to the neck formed at the secondary opening. A dispensing collar is adapted to be secured about this secondary opening.

The adapter further includes a collapsible and expandable hollow center section extending from the dispenser collar to another similar collar referred to as the holder collar. This holder collar is constructed to be detachably securable to the bottle or holder of the supply of fluid substance.

The dispensing device further includes a valving means located within the adapter to selectively seal fluid flow communication therethrough and in this manner shut off the flow of substance from the holder to the dispensing container when the desired amount of substance has already been moved into the dispensing container.

This valving means may include a rubber plug which is adapted to seal the secondary opening of the dispensing container responsive to collapsing or expanding of the collar of the adapter. The plug may include a male member which is selectively positionable in the secondary opening.

It is an object of the present invention to provide a dispensing device which is adaptable to be positioned upon the neck of a standardly sized bottle to allow the dispensing of pre-metered amounts of fluid substance therefrom.

It is an object of the present invention to provide a dispensing device which is easy to use and simple and economical to manufacture.

It is an object of the present invention to provide a dispensing device which can be used to provide an exact metered amount of liquid or granulated solid substance without requiring the usage of both hands of the operator.

It is an object of the present invention to provide a dispensing device for providing metered amounts of fluid substance which utilizes only two moving parts to provide a valving means therefor.

It is an object of the present invention to provide a dispensing device which is capable of dispensing metered amounts of fluid substances without detaching the holder of the metered amount of fluid substance from the source of the substance.

It is an object of the present invention to provide a dispensing container which requires a minimum amount of maintenance thereof.

It is an object of the present invention to provide a dispensing device capable of giving an exactly metered amount of fluid substance quickly.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a front elevation of an embodiment of the present invention showing the dispensing device in position secured to a holder of fluid substances;

FIG. 2 is a cross-section of FIG. 1 taken along lines 2—2 where the valving means is shown in the closed position;

FIG. 3 is a cross-section as shown in FIG. 2 in which the valving means is shown in the opened position;

FIG. 4 is an exploded view of the individual elements of an embodiment of the present invention; and FIG. 5 is a top view of an embodiment of the plug of the present invention.

DETAILED DESCRIPTION OF THE PREFERRED EMBODIMENT

The dispensing device of the present invention is useful in association with a bottle or other holder 10 for containing fluid substances 11 therein which are dispensed in metered amounts. A dispensing container 12 is affixable to the top or neck of the holder 10 by means of a hollow adapter 20.

The adapter 20 is configured with a dispenser collar 22 adapted to be secured to the dispensing container 12. The hollow adapter also includes a holder collar 24 which is adapted to be secured to the neck or other opening of the holder 10. A collapsible and expandable sleeve 26 which is also hollow is secured at one end to the dispenser collar 22 and at the other end to the holder collar 24. With the construction of adapter 20, when the holder collar is secured to the holder of the fluid substances 10 and when the dispenser collar is secured to the dispensing container 12, the sleeve 26 provides a path for fluid flow communication for the substance from within the holder 10 to within the dispensing container 12.

The dispensing container 12 includes a primary opening 14 and a secondary opening 16. The primary opening 14 is adapted to function as an access for dispensing the already metered amounts of substance. A capping means 18 is adapted for usage with the primary opening to selectively close and open the primary opening 14 to allow for the dispensing of the metered amount of substance.

The secondary opening 16 may be configured as a narrowed opening 15 to more effectively allow sealing thereof. The secondary opening 16 provides a flow path through which the substance passes when moving from the holder 10 to the interior of the dispensing container 12. The amount of flow of substance through this fluid flow path is controlled by a valve means 28 which is positioned within the adapter 20.

Valve means 28 may include a plug means 30 which further includes a male member 32 and a disc-shaped section 34. The male member 32 is adapted to selectively be positioned within the secondary opening 16 or the narrowed opening 15 to stop the flow of substance from the holder 10 to the dispensing container 12.

In order to allow the flow of material past the plug means 30 the disc-shaped section 34 should be configured having orifices 36 therein. The plug means 30 is held in place by wedging action between the rim 38 of the holder 10 and the holder collar shoulder 40 of the adapter 20. In this manner a firmly secured valving construction is achieved.

Preferably the dispensing container 12 can include graduated markings 42 thereon. Also threaded means 46 may be usable to facilitate engagement between capping means 18 and primary opening 14 as well as between the adapter 20 and the holder 10 or the secondary opening of the dispensing container 12.

A preferred form of the valving means 28 of the present invention is most clearly shown in FIGS. 2 and 3 in the closed and opened positions, respectively. In the opened position shown in FIG. 3 the flow of fluid substance through the valve is made possible by the apertures 36 of the rubber plug means 30. Also the spaced relation between the plug 30 and the narrowed opening 15 allows the passage of substance 11. In the closed position shown in FIG. 1 while the substance 11 can clearly flow through the orifices 36, engagement between the male member 32 of plug means 30 and the narrowed aperture 15 halts the flow of particulated solid or fluid substance 11 through the hollow section of the adapter.

It should be appreciated that either of the configurations shown in FIGS. 2 and 3 could be chosen to be the relaxed position of the adapter 20. The choice is determined solely by the forces and pressures exerted by the expandable and collapsible section of the sleeve 26 and is also determined by the material from which the sleeve is constructed. Preferably this material will be a plastic or similar substance.

Preferably FIG. 2 will be the relaxed state of the adapter 20. Therefor in the relaxed state the valving means will be in the normally closed position. If it is desired to provide a metered amount of substance the holder 10 and dispensing container 12 can be gripped by the user and inverted. In this inverted position the user will urge the dispensing container 12 downward slightly or urge the holder 10 upward slightly. With either of these movements the valve means 28 will open since the sleeve 26 will expand and the male member 32 of the plug means 30 will be withdrawn from the narrowed opening 15 provided at the secondary opening 16 of the dispensing container 12. In this position substance 11 will flow by the force of gravity from the holder 10 through the hollow adapter 20 into the dispensing container 12. The operator may observe the accumulation of substance 11 within the container 12 until the desired amount of substance has been gathered therein as shown by the graduated markings 42. Once the desired amount of substance has been successfully moved from the holder 10 into the container 12 the force exerted by the user in separating the container from the holder can be released and the sleeve 26 will collapse slightly and return the valving means 28 to the normally closed position in which the male member 32 is positioned within the narrowed aperture 15. At this point the operator can invert the bottle and container construction into the normal orientation and remove the capping means 18 and dispense the metered amount of fluid substance as desired. With this construction a single quick operation for providing an accurately metered amount of particulate solid or other fluid substance is achievable.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A dispensing device for fluid substances comprising:
   a. a dispensing container for holding a metered amount of fluid substance therein for dispensing, said container defining a primary opening and a secondary opening therein;
   b. a capping means detachably affixable over said primary opening to selectively enclose said primary opening as well as to selectively open said primary opening to allow dispensing of a metered amount of fluid substance therethrough;

c. a hollow adapter which includes a dispenser collar being detachably affixable to said secondary opening and further including a holder collar being detachably affixable to a holder of the fluid substance to be dispensed, said holder adapter selectively providing a path of fluid flow communication between the interior of the holder and the interior of said dispensing container, said adapter further including an axially expandable sleeve interconnecting said holder collar and said dispenser collar; and d. valve means positioned within said hollow adapter to selectively meter the flow of fluid substance through said hollow adapter, said valve means including a plug means held immovable with respect to said holder collar, said plug means positioned extending into said secondary opening of said dispensing container to prevent the passage of fluid substance into said dispensing container from said holder thereof, said plug means being disengageable from said secondary opening of said dispensing container to allow dispensing of a metered amount of fluid from the holder to said dispensing container by temporary expanding of said axially expandable sleeve and being reengageable with said secondary opening by releasing of said axially expandable sleeve.

2. The device as defined in claim 1 wherein said plug means includes a disc-shaped section and a male member, said disc-shaped section defining orifices therein to allow fluid substances to flow therethrough, said male member positioned in spaced relation with respect to said secondary opening and retractably positionable therein to selectively prevent fluid flow through said secondary opening.

3. The device as defined in claim 1 wherein said dispensing container includes threaded means about said primary and secondary openings to allow securing of said capping means and said adapter, respectively, thereto.

4. The device as defined in claim 1 wherein said dispensing container includes graduated markings thereon.

5. The device as defined in claim 1 wherein said adapter is made of plastic.

6. The device as defined in claim 1 wherein said plug means is made of rubber.

* * * * *